United States Patent
Sato et al.

(10) Patent No.: US 9,259,901 B2
(45) Date of Patent: Feb. 16, 2016

(54) RESIN SHEET MANUFACTURING APPARATUS AND RESIN SHEET MANUFACTURING METHOD

(71) Applicants: CASIO ELECTRONICS MANUFACTURING CO., LTD., Iruma-shi, Saitama-Ken (JP); CASIO COMPUTER CO., LTD., Shibuya-ku, Tokyo (JP)

(72) Inventors: Masaru Sato, Kodaira (JP); Hisao Aihara, Fuefuki (JP); Satoshi Mitsui, Tokyo (JP); Tomohumi Sano, Iruma (JP)

(73) Assignees: CASIO ELECTRONICS MANUFACTURING CO., LTD., Saitama-Ken (JP); CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/031,947

(22) Filed: Sep. 19, 2013

(65) Prior Publication Data

US 2014/0076491 A1 Mar. 20, 2014

(30) Foreign Application Priority Data

Sep. 20, 2012 (JP) .................. 2012-207382
Sep. 20, 2012 (JP) .................. 2012-207390

(51) Int. Cl.
| | |
|---|---|
| B29C 65/02 | (2006.01) |
| B29C 65/18 | (2006.01) |
| B29C 65/40 | (2006.01) |
| B32B 37/02 | (2006.01) |
| B32B 37/04 | (2006.01) |

(Continued)

(52) U.S. Cl.
CPC .......... *B32B 37/0076* (2013.01); *G03G 15/224* (2013.01); *G03G 15/6591* (2013.01); *B41M 3/10* (2013.01); *G03G 2215/0141* (2013.01)

(58) Field of Classification Search
USPC .............................. 156/277–279, 289, 308.2
See application file for complete search history.

(56) References Cited

U.S. PATENT DOCUMENTS

| 5,636,012 A * | 6/1997 | Uneme et al. .............. 399/325 |
| 7,344,778 B2 | 3/2008 | Nakamura |

FOREIGN PATENT DOCUMENTS

| JP | 2003-154793 A | 5/2003 |
| JP | 2004-107834 A | 4/2004 |

(Continued)

OTHER PUBLICATIONS

Machine Translation of JP 2011-107418 (May 29, 2015).*

(Continued)

*Primary Examiner* — Sing P Chan
(74) *Attorney, Agent, or Firm* — Holtz, Holtz & Volek PC

(57) ABSTRACT

A peeling sheet supply unit is formed along an endless belt and is configured to supply a peeling sheet having a peeling surface on the endless belt. A first resin sheet transfer device is provided at a downstream side of the peeling sheet supply unit, and is configured to form a resin sheet by transferring a thermoplastic toner to a first region of the peeling sheet. A second resin sheet transfer device is provided at a downstream side of the first resin sheet transfer device and is configured to form a resin sheet by transferring a thermoplastic toner to a second region of the peeling sheet, the second region having a region different from a region overlapped with the first region.

15 Claims, 7 Drawing Sheets

(51) Int. Cl.
*B32B 37/26* (2006.01)
*B32B 38/14* (2006.01)
*B32B 43/00* (2006.01)
*B32B 37/00* (2006.01)
*G03G 15/22* (2006.01)
*G03G 15/00* (2006.01)
*B41M 3/10* (2006.01)

(56) References Cited

FOREIGN PATENT DOCUMENTS

| JP | 2005-148139 A | 6/2005 |
| JP | 2007-283745 A | 11/2007 |
| JP | 2010-184470 A | 8/2010 |
| JP | 2011-107418 A | 6/2011 |
| JP | 2011-191401 A | 9/2011 |
| JP | 2014062987 A | 4/2014 |

OTHER PUBLICATIONS

Machine Translation of JP 2011-191401 (May 29, 2015).*

Japanese Office Action dated Jul. 22, 2014, issued in counterpart Japanese Application No. 2012-207390.

Japanese Office Action dated Dec. 3, 2013 (and English translation thereof) in counterpart Japanese Application No. 2012-207382.

* cited by examiner

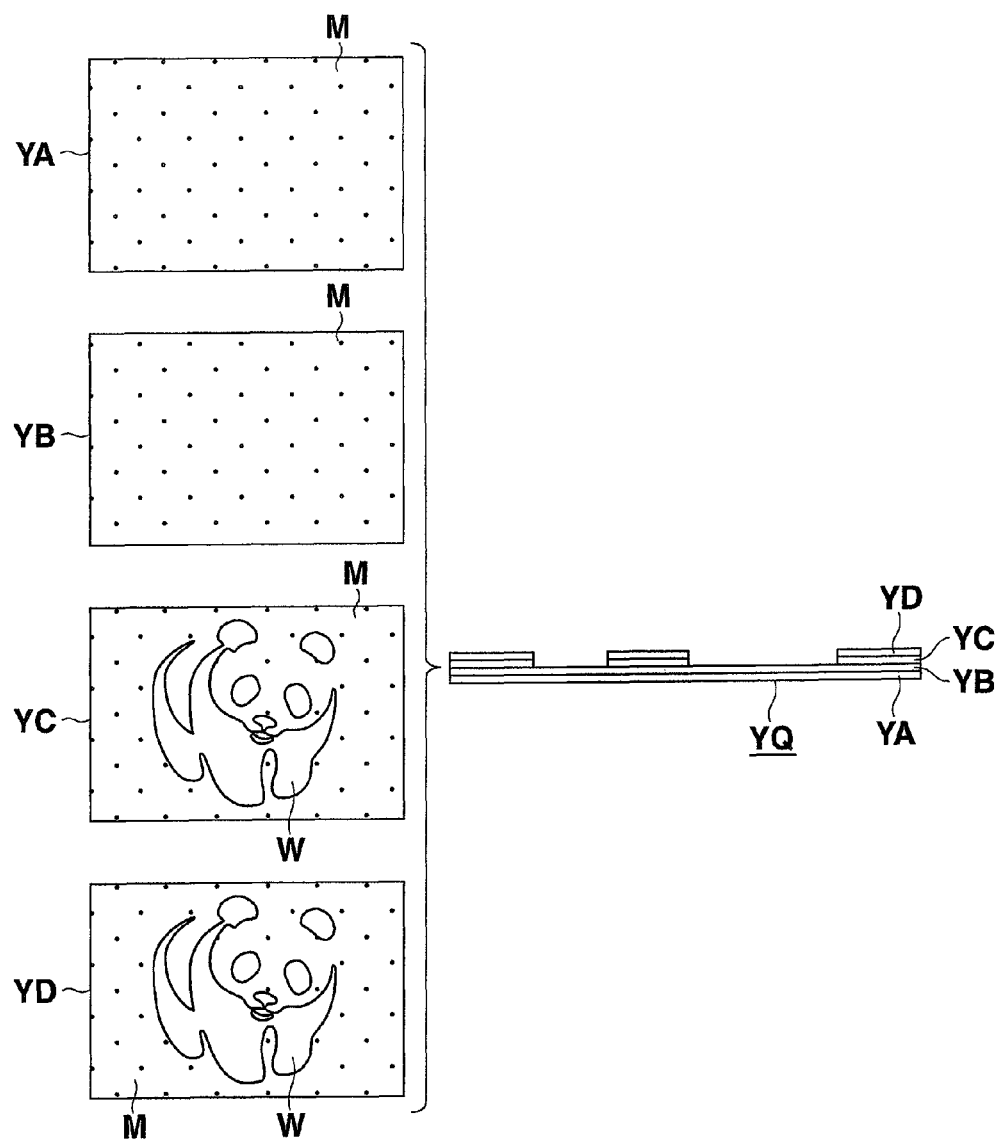

FIG.7A
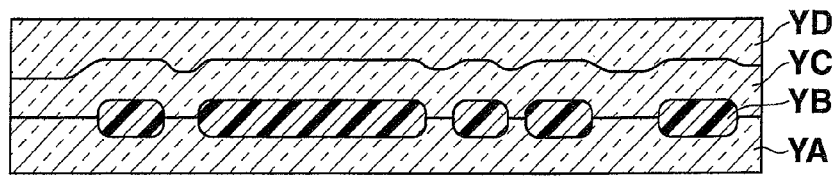
FIG.7B            FIG.7C
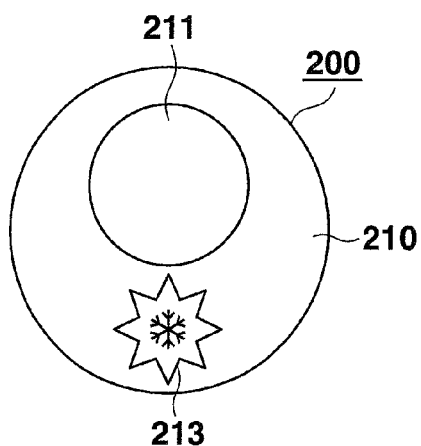 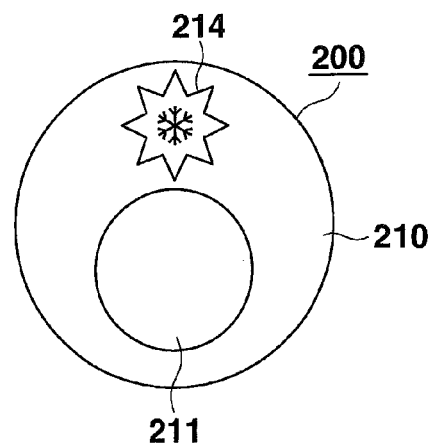
FIG.7D
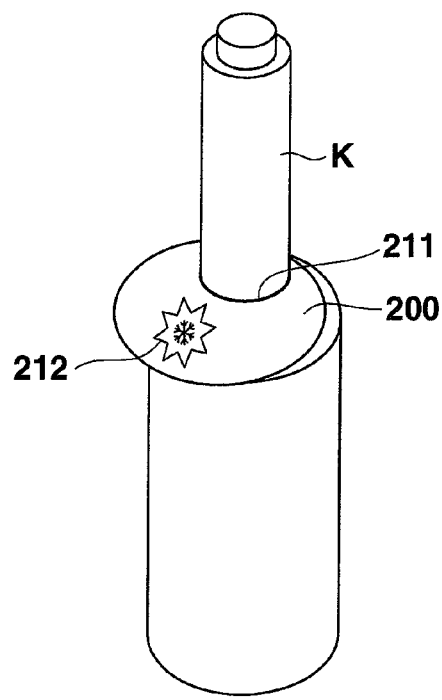

RESIN SHEET MANUFACTURING APPARATUS AND RESIN SHEET MANUFACTURING METHOD

CROSS-REFERENCE TO RELATED APPLICATIONS

This application is based upon and claims the benefit of priority from the prior Japanese Patent Application Nos. 2012-207390, filed Sep. 20, 2012, and 2012-207382, filed Sep. 20, 2012, the entire contents of which are incorporated herein by reference.

BACKGROUND OF THE INVENTION

1. Field of the Invention

Embodiments described here relate to a resin sheet manufacturing apparatus and a resin sheet manufacturing apparatus.

2. Description of the Prior Art

In the past, there is a method for manufacturing a picture-printed resin sheet. The method for manufacturing the resin sheet is to form a resin sheet and print a picture thereon by using an ink or the like.

Also, there are known various label manufacturing technologies. For example, Jpn. Pat. Appln. KOKAI Publication No. 2007-283745 proposes a label producing method and apparatus in which in the case of a label coated with an adhesive on a rear surface, an electrophotographic image forming apparatus using a toner is employed, without making a cutting die, and a label having an arbitrary shape is formed at a desired timing by sequentially forming a label base material, label image, and a seal material on a peeling sheet coated with an adhesive. Also, as a main component of a toner for the label base material, a polyvinyl acetal resin is used.

Also, Jpn. Pat. Appln. KOKAI Publication No. 2010-184470 discloses an example in which a UV-curable polyester resin is used as a constituent resin of the label.

Furthermore, for example, Jpn. Pat. Appln. KOKAI Publication No. 2011-107418 discloses a label forming method and apparatus that use an electrophotographic image forming apparatus and forms a label having a sufficient thickness.

However, the above-described resin sheet manufacturing method has the following problem. That is, printing on the resin sheet provides no stereoscopic effect to the printing and has a lack of diversity. Also, the printing may be erased by water or oil.

SUMMARY OF THE INVENTION

Embodiments have been made in an effort to solve the above-described problems, and are directed to provide a resin sheet manufacturing apparatus and a resin sheet manufacturing method, capable of forming a picture, without using an ink or the like, providing a three-dimensional effect, and manufacturing a resin sheet having an arbitrary shape having an abundant diverse expression, without using a cutting die.

A resin sheet manufacturing method of an embodiment includes: supplying a peeling sheet on a belt being conveyed; transferring a resin to a first region on the peeling sheet; transferring a resin to a second region on the peeling sheet, the second region having a region overlapped with the first region and a region not overlapped with the first region; and fixing the resins of the first region and the second region on the peeling sheet by heating.

Also, a resin sheet manufacturing method of an embodiment includes: transferring a resin to a first region on a belt being conveyed; transferring a resin to a second region on the belt being conveyed, the second region having a region overlapped with the first region and a region not overlapped with the first region; and fixing the resins of the first region and the second region on the peeling sheet by heating.

Furthermore, a resin sheet manufacturing apparatus of an embodiment includes: a conveyance mechanism having a belt; a first transfer device formed along the belt and configured to transfer a resin to a first region of the belt; a second transfer device provided at a downstream side of the first transfer device and configured to transfer a resin to a second region of the belt, the second region having a region overlapped with the first region and a region not overlapped with the first region; and a fixing device configured to curing the resins by heating.

Moreover, the resin of the embodiment is a thermoplastic resin and/or a thermoplastic toner.

In the embodiment, the fixed resin sheet has substantially different thicknesses in the first region and the second region, and is viewed as a watermark image or a relief image.

Also, in the embodiment, the fixed resin sheet is viewed as a watermark image or a relief image by using the resin which transmits light in the first region and using the resin which does not transmit light in the second region.

BRIEF DESCRIPTION OF THE DRAWINGS

FIG. 3 is an explanatory diagram showing a procedure of forming a watermark image by the resin sheet manufacturing apparatus;

FIG. 7A is a sectional view showing an example of a stacked state of each resin in a fourth example of the resin sheet formed by the resin sheet manufacturing apparatus;

FIG. 7B is a plan view showing an example of a front surface of a fourth example of the resin sheet formed by the resin sheet manufacturing apparatus;

FIG. 7C is a plan view showing an example of a rear surface of the fourth example of the resin sheet formed by the resin sheet manufacturing apparatus; and FIG. 7D is a perspective view showing a usage example of the resin sheet

DESCRIPTION OF THE PREFERRED EMBODIMENTS

Hereinafter, embodiments will be described with reference to the drawings.

Figure 1:
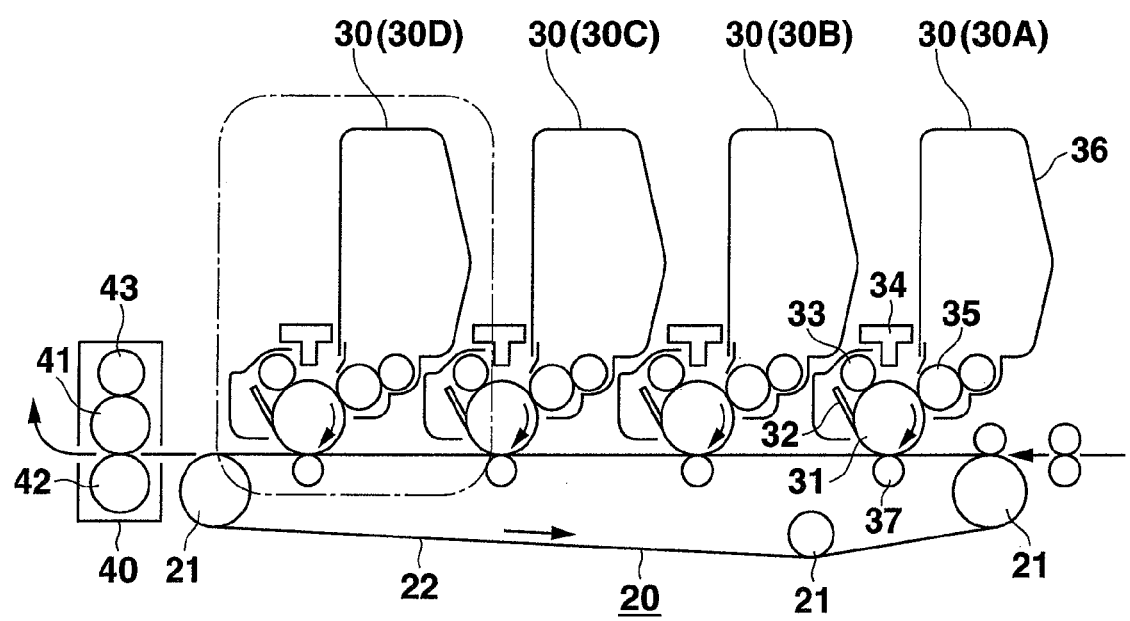
FIG. 1 is an explanatory diagram showing an internal configuration of a resin sheet manufacturing apparatus according to an embodiment.

FIG. 1 is an explanatory diagram showing an internal configuration of a resin sheet manufacturing apparatus 1 according to an embodiment, and FIGS. 2A to 2F are explanatory diagrams showing a resin sheet manufacturing process in the resin sheet manufacturing apparatus 1. Also, in the following description, S represents a resin sheet, P represents a peeling sheet, and T represents a toner as a thermoplastic resin which is a material of the resin sheet S. The peeling sheet P uses a sheet having low surface energy and excellent peel property, and forms the resin sheet S without using an adhesive. A polybutylene succinate resin "GS Pla@), manufactured by Mitsubishi Chemical Corporation, is used as a thermoplastic resin power used in the toner T. It is ground and made into a toner by performing external addition processing of a charge control agent or a liquidity control agent to a 75 μm filter pass particle-size product.

The resin sheet manufacturing apparatus 1 includes a peeling sheet supply unit 10 configured to supply a peeling sheet P, on a surface of which a resin sheet S is to be formed, a conveyance mechanism 20 configured to convey the peeling sheet P, four imaging units 30 (30A, 30B, 30C; 30D) disposed above a transfer belt 22 to be described below along a conveyance direction of the transfer belt 22 and configured to transfer a toner T on the peeling sheet P, and a fixing device 40 disposed at a downstream side in the conveyance direction of the transfer belt 22 and configured to hot-press the peeling sheet P to which the toner T is transferred and fix the toner T on the peeling sheet P.

The conveyance mechanism 20 includes a plurality of driving rollers 21, and the transfer belt (endless belt) 22 disposed over the driving rollers 21 and a transfer roller 37 to be described below.

The imaging units 30 includes a photosensitive drum (resin sheet transfer device) 31 on a surface of which a photo conductor is formed, a doctor sheet 32 disposed to surround a circumferential surface of the photosensitive drum 31 in a circumferential direction, a charging roller 33, an exposure head 34 made of an LED, head, a development roller 35, a toner tank 36 configured to be filled with the toner T and supply the toner T to the development roller 35, and a transfer roller 37 disposed at a bottom surface side of the transfer belt 22 and configured to transfer the toner on the peeling sheet P interposed between the photosensitive drum 31 and the transfer roller 37.

Also, a material of the doctor sheet 32 is selected according to a type of the toner. Specifically, in the case of the toner T, a polyimide resin sheet has been used because the toner T is hardly attached or a shape change is small. A fluorine-based resin sheet or the like may be used in order to improve an attaching method and prevent occurrence of waviness.

The fixing device 40 includes a pair of fixing rollers 41 and 42, and an oil applying roller 43 abutting against the upper fixing roller 41.

Also, the imaging units 30A and 30B are used as a first resin sheet transfer device, and the imaging units 30C and 30D are used as a second resin sheet transfer device. A development layer Y is formed in a region different from an overlapped region, and a resin sheet S having a watermark image is formed. This point will be described later.

In the resin sheet manufacturing apparatus 1 configured as above, the resin sheet S is manufactured as follows. Also, data such as the shape of the resin sheet S or printed characters is composed by a PC or the like, and is input to the resin sheet manufacturing apparatus 1.

Figure 2A:
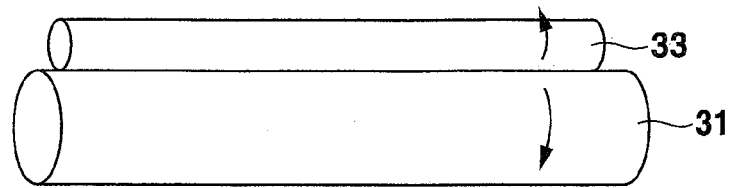
FIG. 2A is an explanatory diagram showing a resin sheet manufacturing process in the resin sheet manufacturing apparatus.
Figure 2B:
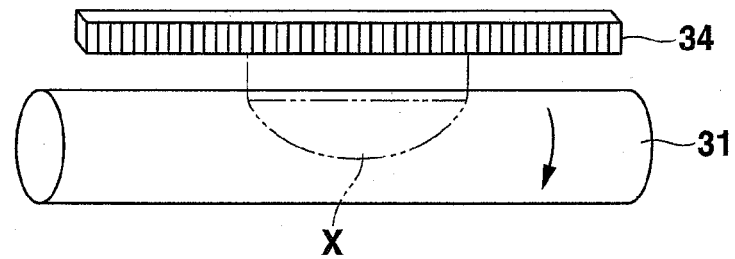
FIG. 2B is an explanatory diagram showing the resin sheet manufacturing process.

The peeling sheet P is supplied to the imaging unit 30A disposed at an upstream side. The photosensitive drum 31 is rotated in an arrow direction (clockwise rotation) of FIG. 1. As shown in FIG. 2A, the photo conductor of the photosensitive drum 31 is charged by the charging roller 33. Next, as shown in FIG. 2B, light is projected on the surface of the charging roller 33 by the exposure head 34, and a pattern of an arbitrary shape is exposed to define a latent image X having a surface potential difference from a non-exposed portion.

Figure 2C:
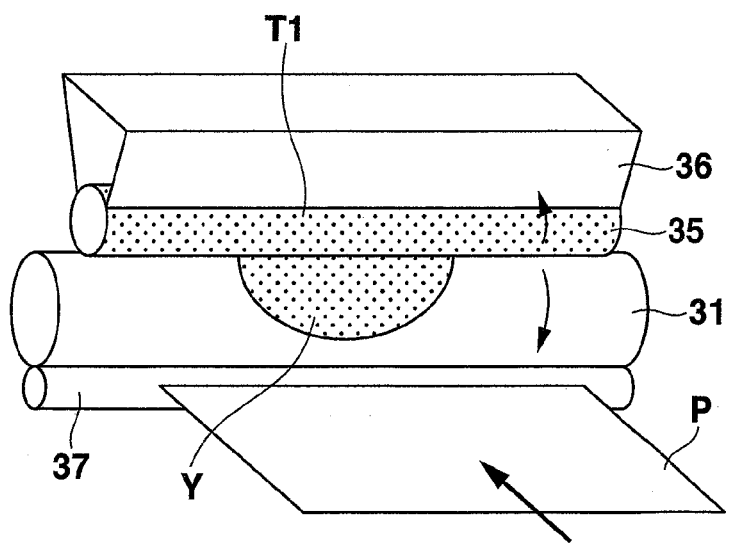
FIG. 2C is an explanatory diagram showing the resin sheet manufacturing process.
Figure 2D:
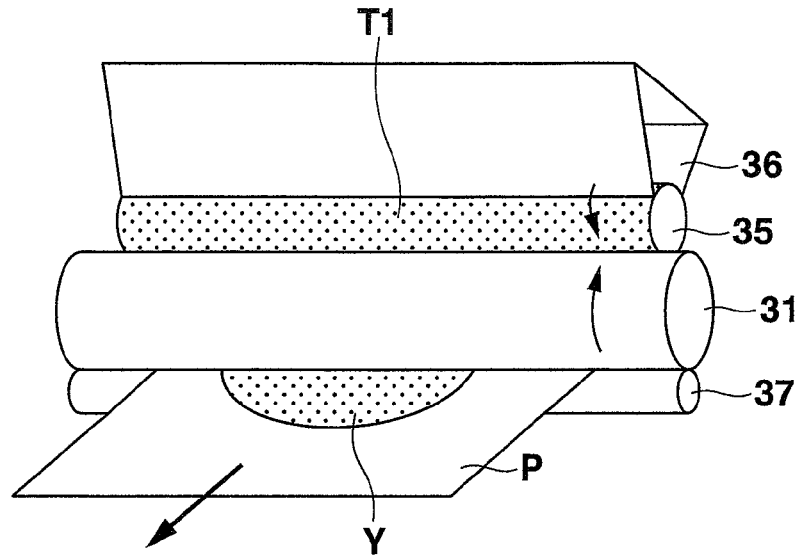
FIG. 2D is an explanatory diagram showing the resin sheet manufacturing process.

Next, as shown in FIG. 2C, the toner T supplied from the toner tank 36 while being agitated is attached to the surface of the development roller 35 by the rotation of the development roller 35.

The toner T charged with static electricity by the agitation is attached from the development roller 35 to the latent image X on the photosensitive drum 31, and a development layer Y is formed. Next, the peeling sheet P is fed in synchronization with the rotational movement of the development layer Y, and the development layer Y and the peeling sheet P are entered at a position contacting the transfer roller 37 in an overlapping manner.

The peeling sheet P is pressed by the photosensitive drum 31 and the transfer roller 37, and the development layer Y is transferred to the peeling sheet P by a toner adsorption potential applied to the transfer roller 37. After the transfer, extra toner T is dropped down from the surface of the photosensitive drum 31 by the doctor sheet 32. The imaging unit 30 transfers the toner T on the peeling sheet P as the development layer Y by repeating the above processes from the charging to the dropping of the extra toner T.

Through the similar operations, the toner T is also attached to the imaging units 30B, 30C and 30D, and a resin sheet S having a predetermined thickness is formed. Also, a procedure of forming a watermark image by forming different development layers Y by the imaging units 30A to 30D will be described below.

The development layers Y formed by the imaging units 30A to 30D are referred to as development layers YA to YD, respectively. As shown in FIG. 3, the imaging unit 30A, the imaging unit 30B, the imaging unit 30C, and the imaging unit 30D form the development layer YA, the development layer YB, the development layer YC, and the development layer YD, respectively. The development layer YA and the development layer YB have only the ground M. In the development layer. YC and the development layer YD, a picture W portion is opened with respect to the ground M. A single development layer YQ is formed by overlapping the development layers YA to YD on the peeling sheet P. Also, the ground M is an overlapped region in the development layers YA to YD, and the picture W is a different region in the development layers YA to YD.

Figure 2E:
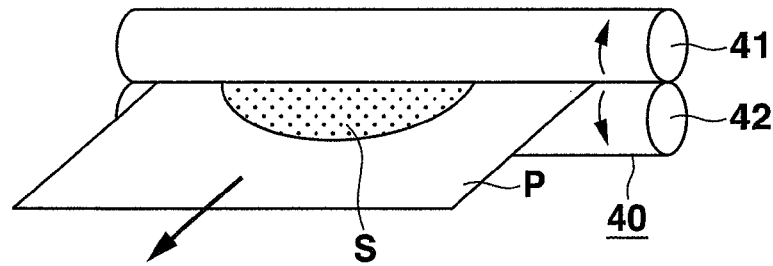
FIG. 2E is an explanatory diagram showing the resin sheet manufacturing process.
Figure 2F:
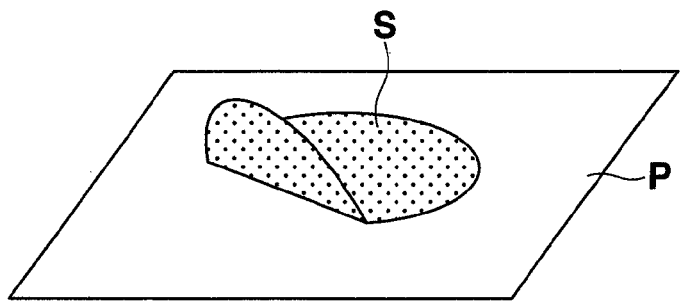
FIG. 2F is an explanatory diagram showing the resin sheet manufacturing process.
Figure 4:
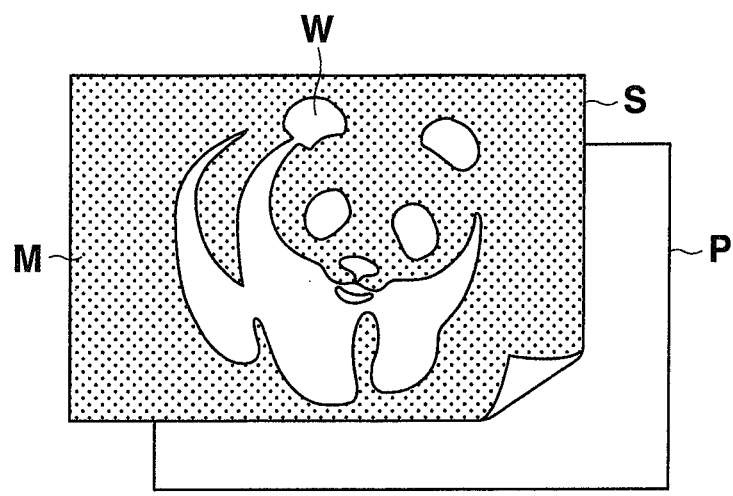
FIG. 4 is a plan view showing an example of a resin sheet formed by the resin sheet manufacturing apparatus.

Finally, as shown in FIG. 2E, the development layer YQ and the peeling sheet P pass through the fixing device 40, and the toner T forming the development layer YQ is fused and solidified by heating and pressurization and is fixed on the peeling sheet P. In this manner, the resin sheet S is formed.

As described above, the thickness of the resin is different because four development layers Y are overlapped in the ground M portion of the resin sheet S, and two development layers Y are overlapped in the picture W portion. Therefore, due to different light transmittance, the watermark image is formed.

The resin sheet S formed by the resin sheet manufacturing apparatus 1 is in a state of being attached to the peeling sheet P. However, at the time of fixing, the surface energy of the fixing roller 41 contacting the top surface of the development layer Y is set to be equal to or lower than the surface energy of the peeling sheet P. Thus, the resin sheet S after the fixing is discharged without being peeled off from the peeling sheet S, without using any adhesive. On the other hand, the resin sheet S can be easily peeled off from the peeling sheet P, and a film of an arbitrary shape can be formed.

Also, the oil applying roller 43 is used for the following reasons. That is, since the surface energy of the peeling sheet P is small, the development layer Y is hardly attached to the peeling sheet P. Therefore, when the development layer Y is formed on the peeling sheet P by a typical electrographic printer or the like, the development layer Y may be attached to the fixing roller 41 and may be peeled off (offset) from the peeling sheet P. Therefore, by causing the oil applying roller 43 to abut against the fixing roller 41, the surface energy of the fixing roller 41 is lowered to improve the offset. Also, as the oil, silicon oil is preferable.

In addition, the offset phenomenon can be prevented in an oilless manner by configuring the surface of the fixing roller 41 with a fluorine-based resin. As the preventable condition, the surface energy of the fixing roller 41 is set to be equal to or lower than the surface energy of the peeling sheet P used herein. In this manner, the development layer Y adsorbed on the peeling sheet P by the electrostatic adsorption force is not offset.

Also, in the resin sheet manufacturing apparatus 1, a plurality of imaging units 30 is arranged in tandem and transfers the development layers Y in an overlapping manner. However, the layer thickness of the development layer Y in the imaging units 30 alone can be changed by the abutting condition of the doctor sheet 32 or the setting of a linear velocity difference between the photosensitive drum 31 and the development roller 35. Also, when the layer thickness of the resin sheet S formed from the development layer Y formed in one imaging unit 30 is about 30 μm, the layer thickness of the resin sheet S formed by overlapping four development layers Y is 70 to 80 μm and has a practical tearing strength.

Also, in pattern printing at the time of forming the resin sheet S, solid printing without dithering is enabled at all positions. At the time of each position 100% solid printing, it is modified to enable the layer formation of maximum 400% printing rate four times in succession. 30 μm in the single layer and 70 to 80 μm in four overlapped layers refer to the layer thicknesses in the cases of 100% solid printing and 400% solid printing, respectively. Although the layer thickness of the four-layer film is thin as compared with the layer thickness of the single layer, the weight becomes substantially three times. Thus, there is a difference in layer density.

Figure 5:
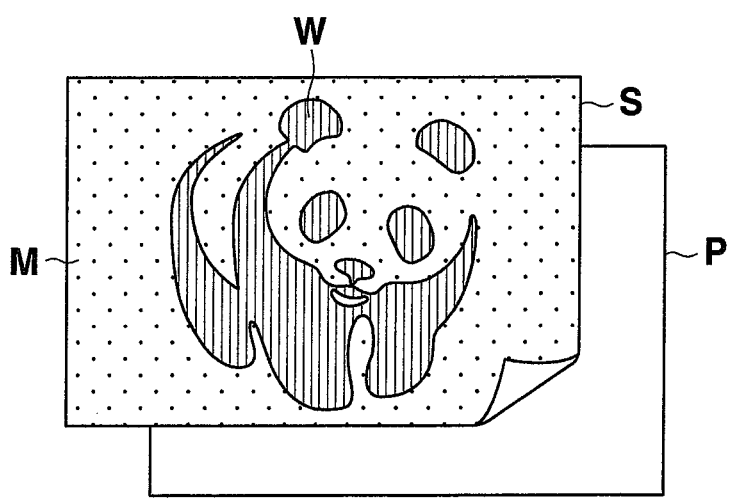
FIG. 5 is a plan view showing a second example of the resin sheet formed by the resin sheet manufacturing apparatus.

Also, in the above-described example, the position corresponding to the ground M is formed thickly and the position corresponding to the picture W is formed thinly. However, as shown in FIG. 5, the picture W may be formed as a relief image in such a manner that the position corresponding to the ground M is formed thinly and the position corresponding to the picture W is formed thickly.

Furthermore, a three-layer watermark can also be formed in such a manner that the ground M is formed with one development layer YA and the opening corresponding to the picture W is appropriately provided in other development layers YB, YC and YD.

As described above, according to the embodiment, the watermark image or the relief image can be formed by changing the overlapping number of the development layers Y with respect to the ground M portion and the picture W portion. Thus, a wide variety of resin sheets S can be formed. Since the toner T can be attached based on data input in the PC or the like, the resin sheet S having an arbitrary shape can be formed. Furthermore, since a cutting die is not required, the resin sheet S can be manufactured at a low cost.

Figure 6A:
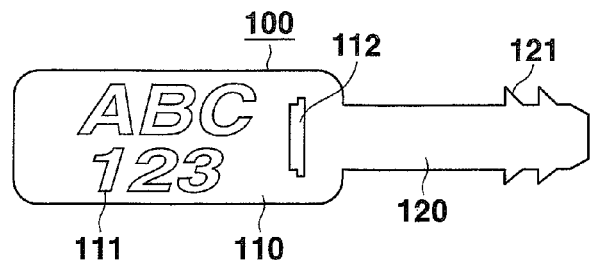
FIG. 6A is a plan view showing a third example of the resin sheet formed by the resin sheet manufacturing apparatus.
Figure 6B:
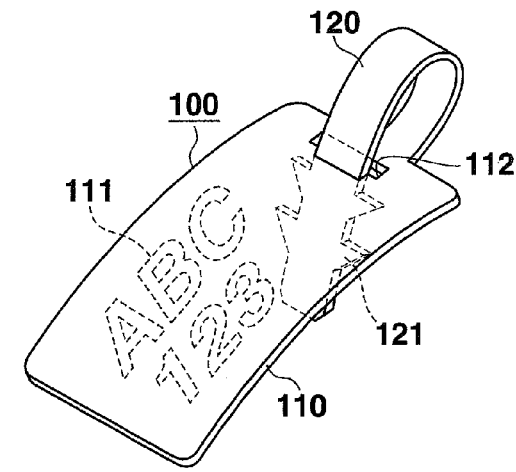
FIG. 6B is a perspective view showing a usage example of the resin sheet.

Also, as another embodiment, FIG. 6A and FIG. 6B show a product tag 100 made of the resin sheet S. The product tag 100 includes a body 110 and a protrusion 120. In the body 110, a character 111 and an opening 112 are formed. In the protrusion 120, an engagement portion 121 is formed. The product tag 100 can be wound around a product by inserting the engagement portion 121 into the opening 112 in an engaged manner.

Also, in the opening 112, an empty portion can be formed by forming no toner T by the imaging units 30. Also, the character 111 portion is formed as a watermark character by operating only the imaging units 30A and 30B to form a two-layer toner T.

Figure 6C:
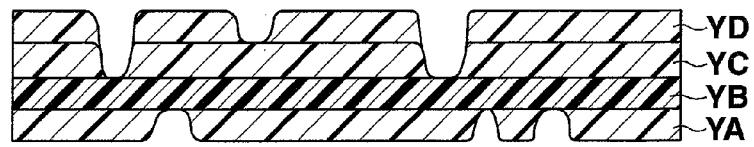
FIG. 6C is a sectional view showing an example of a stacked state of each resin in the resin sheet.
Figure 6D:
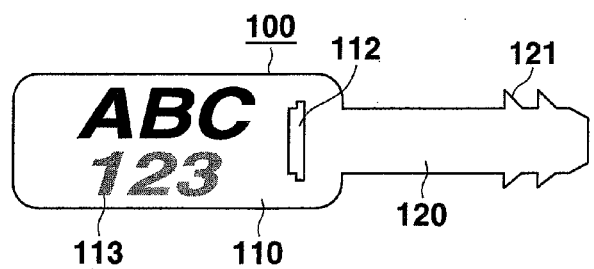
FIG. 6D is a plan view showing an example of a front surface of the resin sheet.
Figure 6E:
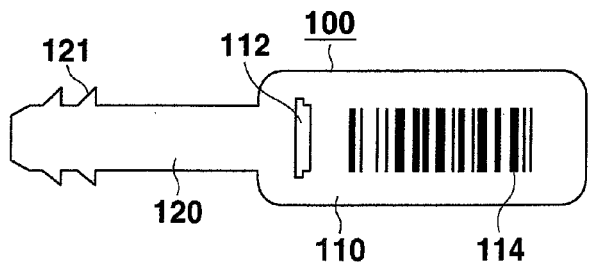
FIG. 6E is a plan view showing an example of a rear surface of the resin sheet.

Furthermore, a toner T using a resin, which hardly transmits light, is put into the imaging units 30A, 30C and 30D, and a black toner is put into the imaging unit 30B. Then, by stacking as shown in FIG. 6C, different pictures 113 and 114 can be formed on a front surface (FIG. 6D) and a rear surface (FIG. 6E) of the product tag 100 made of the resin sheet S. Also, a watermark character portion can also be formed.

Moreover, as another embodiment, FIG. 7B to FIG. 7D show a bottle product ornament 200 made of the resin sheet S. The bottle product ornament 200 includes a body 210, an opening 211 formed in the body 210, and a picture 213. The opening 211 can be attached to a bottle K or the like. In the bottle product ornament 200 made of the resin sheet S, a toner T using a substantially transparent resin, which transmits light, is put into the imaging units 30A, 30C and 30D, and a black toner is put into the imaging unit 30B. Then, by stacking as shown in FIG. 7A, the same pictures 213 and 214 can be formed on a front surface (FIG. 7B) and a rear surface (FIG. 7C) of the bottle product ornament 200.

Although the peeling sheet P is used as a mount in the above-described embodiment, the development layer Y may be directly formed on the transfer belt 22, without using the peeling sheet P, and may be fixed by passing the development layer Y through the fixing device 40. Even in this case, the same effect as that of the above-described resin sheet manufacturing apparatus 1 can be obtained.

As described above, according to the embodiment, since the toner T can be attached based on data input in the PC or the like, the resin sheet S having an arbitrary shape can be formed. Furthermore, since a cutting die is not required, the resin sheet S can be manufactured at a low cost.

Also, in the resin sheet S, a necessary shape need not be taken out or cut from a large sheet through a cutting die. Thus, a resin material of a portion other than the necessary shape is not wasted.

Also, the subject matter disclosed herein is not limited to the above embodiments. For example, the above-described embodiment takes means of securing the film layer thickness by arranging the imaging units in tandem, but the apparatus can be miniaturized as a single imaging unit for film formation as long as a sufficient layer thickness can be obtained in the single imaging unit. Also, a full-color printed film may be formed by arranging the imaging unit for film formation and four imaging unit for CMYK printing in tandem. In addition, various modifications can also be made without departing from the scope of the subject matter disclosed herein.

Although several embodiments have been described, these embodiments are for illustrative purposes and are not intended to limit the scope of the subject matter disclosed herein. These novel embodiments can be practiced in various forms, and various omissions, substitutions and modifications can be made without departing from the essentials of the subject matter disclosed herein. These embodiments or modifications thereof fall within the scope of essentials of the subject matter disclosed herein and fall within the subject matters described in claims and equivalents thereof.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

The invention claimed is:

1. A resin sheet manufacturing method comprising:
supplying a peeling sheet on a belt being conveyed;
transferring a first resin to a first region on the peeling sheet;
transferring a second resin to a second region on the peeling sheet, the second region including the first region; and
fixing the first resin and the second resin on the peeling sheet by simultaneously heating the first resin and the second resin, thereby forming a resin sheet.

2. The resin sheet manufacturing method according to claim 1, wherein a thickness of the resin sheet in the first region is substantially different from a thickness of the resin sheet in the second region.

3. The resin sheet manufacturing method according to claim 2, wherein the fixing uses a fixing roller that faces the peeling sheet on which the first and second resins have been transferred, and oil is supplied to the fixing roller during the fixing.

4. The resin sheet manufacturing method according to claim 2, wherein each of the first resin and the second resin is at least one of a thermoplastic resin and a thermoplastic toner.

5. The resin sheet manufacturing method according to claim 4, wherein the fixing uses a fixing roller that faces the peeling sheet on which the first and second resins have been transferred, and oil is supplied to the fixing roller during the fixing.

6. The resin sheet manufacturing method according to claim 1, wherein the second resin transmits light.

7. The resin sheet manufacturing method according to claim 6, wherein the fixing uses a fixing roller that faces the peeling sheet on which the first and second resins have been transferred, and oil is supplied to the fixing roller during the fixing.

8. The resin sheet manufacturing method according to claim 6, wherein each of the first resin and the second resin is at least one of a thermoplastic resin and a thermoplastic toner.

9. A resin sheet manufacturing method comprising:
transferring a first resin to a first region on a belt being conveyed;
transferring a second resin to a second region on the belt being conveyed, the second region being included in the first region; and
fixing the first resin and the second resin by simultaneously heating the first resin and the second resin, thereby forming a resin sheet.

10. The resin sheet manufacturing method according to claim 9, wherein a thickness of the resin sheet in the first region is substantially different from a thickness of the resin sheet in the second region.

11. The resin sheet manufacturing method according to claim 10, wherein a thickness of the uses a fixing roller that faces the belt on which the first and second resins have been transferred, and oil is supplied to the fixing roller during the fixing.

12. The resin sheet manufacturing method according to claim 10, wherein each of the first resin and the second resin is at least one of a thermoplastic resin and a thermoplastic toner.

13. The resin sheet manufacturing method according to claim 12, wherein the fixing uses a fixing roller that faces the belt on which the first and second resins have been transferred, and oil is supplied to the fixing roller during the fixing.

14. The resin sheet manufacturing method according to claim 9, wherein the first resin transmits light and the second resin does not transmit light.

15. The resin sheet manufacturing method according to claim 14, wherein each of the first resin and the second resin is at least one of a thermoplastic resin and a thermoplastic toner.

* * * * *